UNITED STATES PATENT OFFICE.

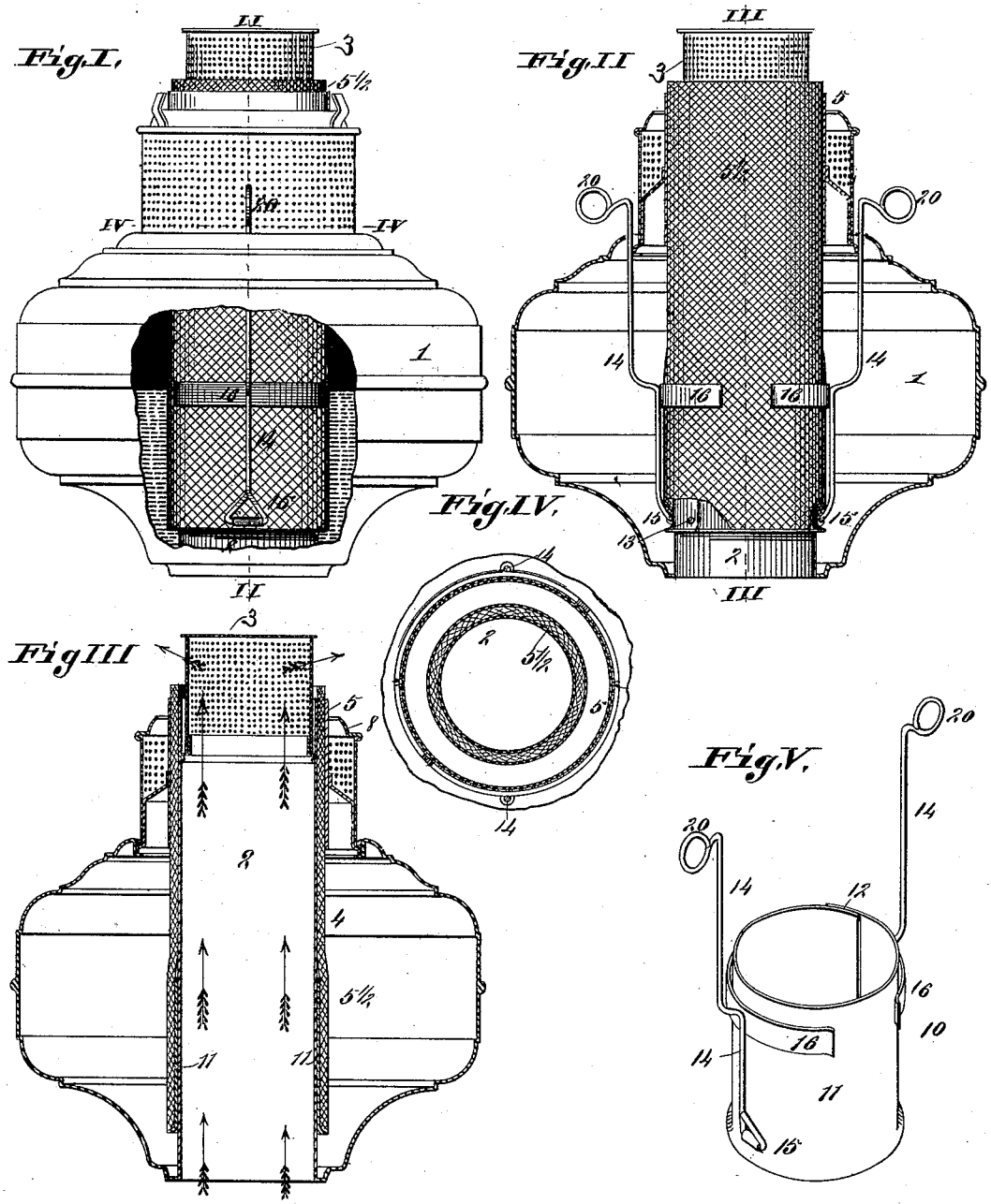

FERDINAND MEYROSE, OF ST. LOUIS, MISSOURI.

WICK-RAISER.

SPECIFICATION forming part of Letters Patent No. 387,529, dated August 7, 1888.

Application filed August 12, 1887. Serial No. 246,785. (No model.)

*To all whom it may concern:*

Be it known that I, FERDINAND MEYROSE, of the city of St. Louis, in the State of Missouri, have invented a certain new and useful Improvement in Wick-Adjusters, of which the following is a full, clear, and exact description, reference being had to the accompanying drawings, forming part of this specification, and in which—

Figure I is a side elevation with part of the reservoir of the lamp broken away. Fig. II is a section taken on line II II, Fig. I, the wick-tube and the wick holder being shown in elevation. Fig. III is a vertical section taken on line III III, Fig. II. Fig. IV is a transverse section taken on line IV IV, Fig. I. Fig. V is a perspective view of the wick-holder.

My invention relates to that class of oil-lamps in which a reservoir, 1, is provided with a central air-tube, 2, having on top a cylindrical cap, 3, perforated in its side and adjustable vertically to regulate the number of perforations available for the passage of air and thus the amount of air supplied to the interior of the flame. These parts are common, as is also the cylindrical wick 4 and outer tube, 5, the wick 5½ fitting between the air-tube 2 and the outer tube, 5, as shown in Figs. III and IV.

10 represents a wick-holder, to which my invention particularly relates. It consists of a cylinder or tube, 11, which surrounds the air-tube 2 and moves vertically thereon as the wick is raised or lowered or put in and removed. The wick is slipped over this cylinder, and to provide for wicks of slightly different sizes (and to provide for an easy insertion of the cylinder into the wick) I form the cylinder with a lap-joint, 12, connected at the bottom by a rivet, 13. (See Fig. II.) It will thus be seen that the upper end of the cylinder may be decreased in size, by pressure, as the joint 12 is susceptible of being lapped more or less. The wick is held on the cylinder by wires 14, hinged at 15 to the cylinder. These wires are provided with arms 16, which preferably partially surround the cylinder and hold the wick firmly to the cylinder when the wires are pressed inward at their upper ends. In putting the wick in place the wires enter recesses in the mouth or opening of the reservoir 1, (see Fig. II,) and their free ends are thus held in toward the wick, causing the wick to be held upon the cylinder through means of the arms 16. The natural tendency of the wires would be to spring open much farther than is shown in Fig. II; but they are held closed by the mouth of the reservoir in which they fit, and thus the arms are held pressed against the wick, as stated. The upper ends of the wires are provided with suitable enlargements, 20, to afford finger-holds, so that by grasping these enlargements and lifting upward on the wires the wick may be raised; or, by pressure downward upon the wires, the wick may be lowered.

I claim as my invention—

1. In combination with the reservoir having recessed openings in its top and air-tube, the wick-holder consisting of a cylinder, wires secured to the cylinder, and arms on the wires, the upper ends of the wires bearing in said recesses to hold the arms pressed against the wick, substantially as and for the purpose set forth.

2. The combination, with the reservoir having an opening for the reception of a burner, of a wick-holder consisting of tube 11, expansible at top, and wires 14, substantially as described, for holding the wick to the tube, said wires being confined between the mouth of the reservoir and upper expansible end of the tube, as explained.

3. In combination with the reservoir and air-tube, the wick-holder consisting of the flexible cylinder, hinged wires, and arms secured to the wires, the upper ends of the wires being adapted for prehension, substantially as and for the purpose set forth.

4. In combination with the reservoir and air-tube, the wick-holder consisting of a cylinder having a lap-joint, 12, connected by a rivet, 13, wires secured to the cylinder, and arms on the wires, substantially as and for the purpose set forth.

FERDINAND MEYROSE.

In presence of—
GEO. H. KNIGHT,
EDW. S. KNIGHT.